March 28, 1939.  H. T. AVERY  2,152,171
GOVERNOR
Filed May 4, 1935  3 Sheets-Sheet 1
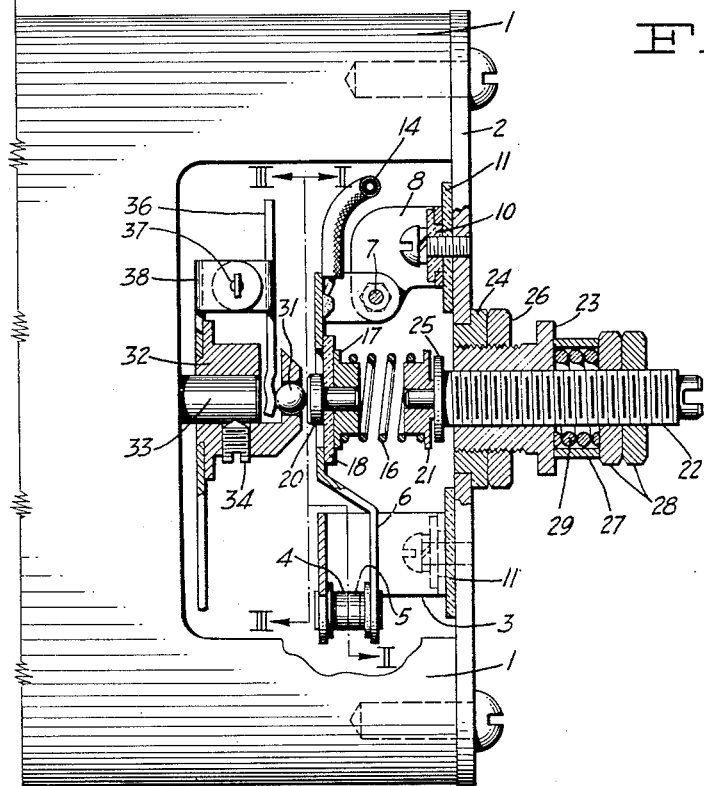
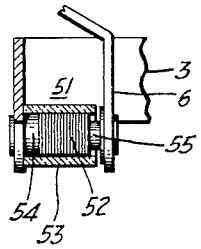
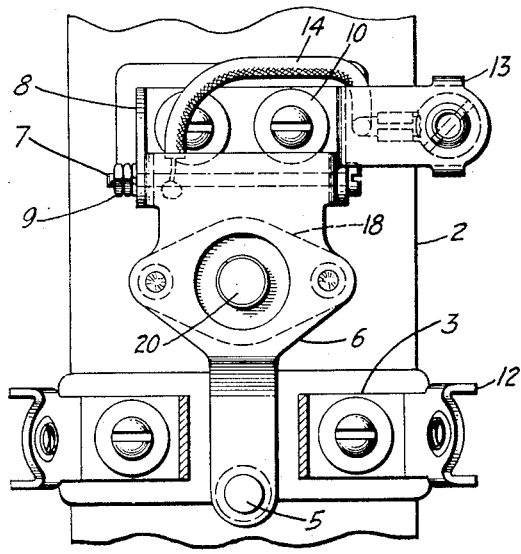
INVENTOR.
Harold T. Avery
BY Chas. E. Townsend.
ATTORNEY.

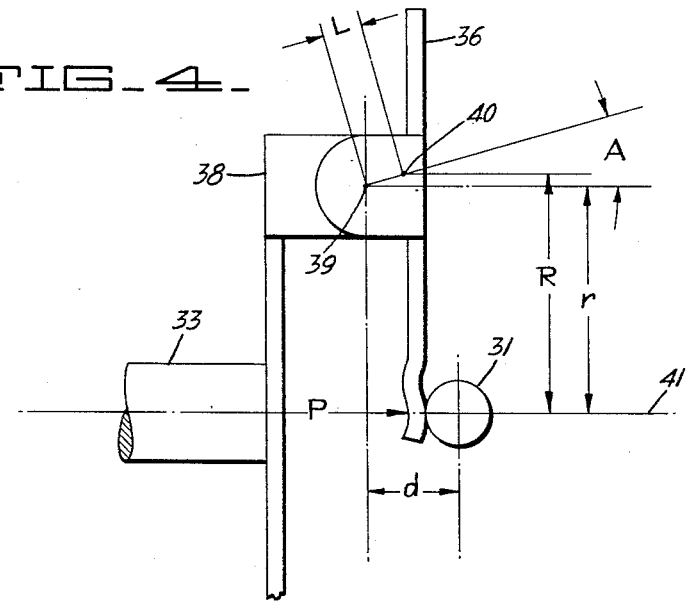
FIG_4_
FIG_5_

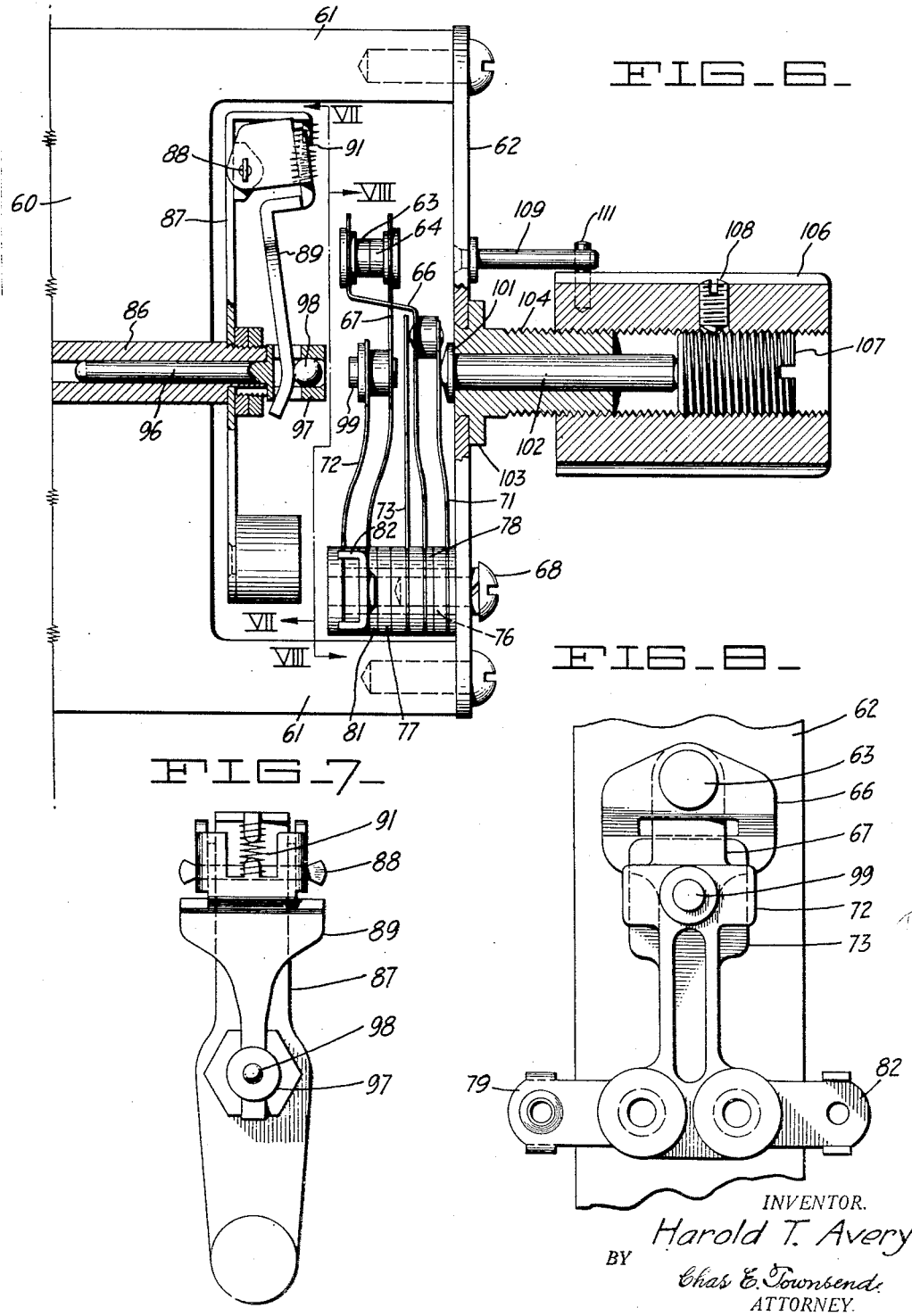

Patented Mar. 28, 1939

2,152,171

UNITED STATES PATENT OFFICE 2,152,171

GOVERNOR

Harold T. Avery, Oakland, Calif., assignor to Marchant Calculating Machine Company, a corporation of California Application May 4, 1935, Serial No. 19,901

4 Claims. (Cl. 200—80)

The present invention relates to speed regulating devices and particularly to a governor construction which has proven of advantage in the regulation of fractional horse-power electric motors. Such motors are now incorporated in many machines to replace or supplement hand operation, particularly in adding and calculating machines, and the present governor is particularly adapted for use in such machines.

It is an object of the present invention to provide a governor structure in which departures from the set speed due to wear of the parts will in a large measure be automatically compensated.

A further object of the invention is the provision of means whereby such alteration in the relationship of the parts as occurs due to wear will effect only a minimum departure of the device from the set speed.

A further object of the invention is the provision of a governing device which is particularly adapted for use with an intermittently operated motor in that the end thrust exerted upon the motor shaft will decrease as the motor coasts to a stop. This is of particular importance in calculating machine motors because a large part of their total time of operation is consumed in building up to and coasting down from an operating speed which is maintained only for short periods.

A further object of the invention is the provision of adjustments for determining both a particular governed speed and the range of governed speeds within which a selection may be made, the latter adjustment comprising independently settable devices for separately determining the maximum and minimum limits of the said range.

In addition to the foregoing objects and advantages, the invention possesses numerous others, a number of which, in connection with the foregoing, will appear in detail with the following description of a preferred form of the device, reference being had therein to the accompanying drawings forming a part of this specification, in which:

Figure 1 is a side elevation, partly in section, of a motor in which a device embodying the invention has been installed;

Figure 1A is a detail of a modification of the device shown in Figure 1;

Figure 2 is a section on the line II—II of Figure 1;

Figure 3 is a section on the line III—III of Figure 1;

Figure 4 is a diagrammatic detailed view of the governor lever arm, illustrating mathematical considerations entering into its design;

Figure 5 is a chart illustrating the performance characteristics of the governor lever arm illustrated in Figure 4;

Figure 6 is a side elevation, partly in section, of a motor embodying an alternative form of a governor embodying the present invention;

Figure 7 is a section on line VII—VII of Figure 6; and

Figure 8 is a section on line VIII—VIII of Figure 6.

The preferred form of the invention comprises a pair of contacts, spring pressed into contact to normally effect acceleration of the motor and movable by a mechanism responsive to changes in centrifugal force to effect deceleration of the motor. In order to insure the maintenance of contact faces in mutual alignment, they are preferably carried on rigid members, the magnitude of the centrifugal force necessary to move them being determined by the application of spring pressure adjustably applied so as to permit selection of the speed at which the device driven will be held by the governor.

Referring to Figure 1, arms 1 of the motor frame support a plate 2 extending diametrically across the motor frame, and having fixed thereon a contact bracket 3 carrying a fixed control contact 4. Cooperating with this fixed contact is a movable contact 5 mounted on lever arm 6 pivotally supported at its upper end at 7 in a bracket 8, also carried by the plate 2. Brackets 3 and 8 are insulated from plate 2 by means of insulation washers 10 and 11, and are provided adjacent the edges of plate 2 with connection lugs 12 and 13, respectively (see also Figure 2), lever 6 being electrically connected to bracket 8 by means of a very flexible wire 14 in order to avoid the necessity for transmission of current through the pivotal mounting 7. Contact 5 is normally pressed into engagement with contact 4 by means of a light spring 16, one end of which bears against anchor disc 17 fixed in insulating member 18 by means of a rivet 20, against the head of which the rotatable element of the governor is adapted to bear. The strip 18, in turn, is fixed to lever 6, said lever being cut away adjacent the rivet 20 so as to prevent grounding of the contact members to the frame. The other end of spring 16 bears against anchor disc 21 freely rotatable on the reduced end of threaded rod 22 carried in sleeve 23 which, in turn, is threaded and carried in nut 24 fixed in plate 2, and is adapted to be locked in a selected adjustment by lock nut 26.

The setting of the sleeve 23 within nut 24 will determine the minimum compression of spring 16 and thus determine the minimum speed to which the motor governor may be adjusted by rotational adjustment of the threaded rod 22. For this purpose the threaded rod 22 is provided with a flange 25 adapted to abut the inner end of sleeve 23 to limit the extent of its movement in a speed reducing direction. The maximum compression which may be applied to spring 16, and hence the maximum speed at which the motor will be permitted to run, is determined by a sleeve 27 adapted to contact lock nuts 28 adjustable upon the threaded rod 22 and these serve to limit the inward movement of rod 22 within sleeve 23. Spring 29 compressed between one end of sleeve 23 and one of the lock nuts 28, prevents displacement of threaded rod 22 within sleeve 23 by the ordinary vibration incident to operation of the motor. It will thus be evident that the minimum speed may be determined by adjustment of sleeve 23, the maximum speed by adjustment of nuts 28, and that thereafter the desired speed within the range thus determined may be determined by adjustment of rod 22 within the sleeve 23.

The mechanism responsive to changes in centrifugal force to operate this contact structure comprises a ball 31 loosely carried in a bracket 32 which is fixed to the motor shaft 33 by means such as a set screw 34, which ball 31 is adapted to bear against the head of rivet 20 carried by lever 6. Adapted to press said ball against the rivet 20 is a lever 36 pivotally mounted at 37 in a bracket 38 also fixed to motor shaft 33, being preferably integral with bracket 32.

In order to avoid undesired alterations (as an incident to wear of the parts) of the speed to which the device driven will be held by the governor, the arrangement is such that the wear of certain parts will operate in the proper direction to offset the wear of certain other parts so far as the effect on motor speed is concerned. In the embodiment just described, it is apparent that mechanical wear between the ball 31 and the rivet 20 will tend to require a greater counter-clockwise movement of lever 36 for breaking the contacts 4 and 5; so the contact members 4 and 5 are arranged in such a way that electrical wear, i. e., disintegration of contact faces, will tend to increase the counter-clockwise movement of lever 36 required to separate said contacts, offsetting the effect of the mechanical wear.

Such compensation, however, is only approximate at its best, depending, as it does, upon the relative wearing qualities of the parts involved and their size. For this reason it is also desirable to provide a special construction of the centrifugally responsive mechanism, whereby the pressure exerted by it upon the control mechanism will remain very close to constant, notwithstanding considerable alterations of the relation of the parts by such wear as described above, whether or not the wear-compensating arrangement described is utilized.

This important feature of the present invention is exemplified in the construction of arm 36 so that the location of its center of gravity is such as will permit a maximum of departure of its lower end from normal operating position without more than a minimum variation in the pressure exerted by said lower end against the ball 31.

Referring to Figure 4, the lever 36 is pivoted so as to be freely movable about the center 39 which is the central axis of the pin 37 shown in Figures 1 and 3. The lever 36 is so shaped that its center of gravity lies at a point 40. When the motor is running the entire assembly revolves about axis 41, which is the central axis of the motor shaft, which axis also passes through the center of ball 31. The operation of the motor therefore sets up a centrifugal force acting radially outward through the center of gravity 40 which therefore produces a torque tending to turn lever 36 in a counter-clockwise direction about pivot 39, the torque being equal in amount to the centrifugal force C times its lever arm which is L cos A. The size of the centrifugal force C in turn is dependent upon the distance of the center of gravity from the axis of rotation which distance is equal to $r + L \sin A$.

In order to keep the pressure of ball 31 against stud 20 as constant as possible, it is desirable to keep the pressure P acting as nearly as possible along the line of axis 41. To accomplish this the lower end of lever 36 may be shaped to a curve which will always be perpendicular to axis 41 at its point of intersection therewith. Such a curve will be very closely approximated by a circle with its center at approximately the point where axis 41 pierces the plane described by pivot 39 in its revolution. Under these circumstances the torque set up about the pivot 39 by the pressure of ball 31 on lever 36 is substantially equal to Pr.

To express these relations mathematically, let $T_1$ = the torque at center 39 (Figure 4) set up by the centrifugal force on lever 36;

$T_2$ = the counterbalancing torque at the same center set up by the pressure of ball 31 on lever 36;

C = the centrifugal force acting at the center of gravity 40 of lever 36;

L = the distance between the center of gravity 40 of lever 36 and its pivot center 39;

A = the angle indicated in Figure 4;

W = the weight of lever 36;

V = the rotational velocity at the center of gravity 40 of lever 36;

r = the distance between axis 41 of the shaft and center 39 on which lever 36 is pivoted;

R = the distance between the center of gravity 40 of lever 36 and axis 41 of the shaft;

n = speed of motor shaft; and

K = a constant depending upon the system of units employed.

We may then derive a formula for P as follows:

$$T_1 = C \cdot L \cos A \quad (1)$$
$$T_2 = Pr \quad (2)$$

Since $T_1 = T_2$     (3)

Therefore $$C \cdot L \cos A = Pr \quad (4)$$

and $$P = \frac{C \cdot L \cos A}{r} \quad (5)$$

$$R = r + L \sin A \quad (6)$$

(see Figure 4)

$$C = KWRn^2 \quad (7)$$

usual formula for centrifugal force $$C = KWn^2(r + L \sin A) \quad (8)$$

substituting (6) in (7)

$$P = \frac{KWn^2}{r} \cdot L \cos A \, (r + L \sin A) \quad (9)$$

substituting (8) in (5)

The object of the invention is to render a given governor operating at a given motor speed as independent as possible of changes in angle A, which angle may change due to wear. Applying this mathematically to Equation (9) above, it seems that if W, L, R, and n are considered as constants, we want P to vary as little as possible with changes in the angle A. It is obvious that the lever arm, L cos A, reaches a maximum when the angle A is zero and that departures of the angle A in either direction from zero will have less effect upon the lever arm L cos A than will similar departures in any other range of the angle A. However, the size of the centrifugal force, which is proportional to $r+L \sin A$ will be affected to a maximum extent by variations in A when A is approximately zero.

In Figure 5, which is merely exemplary and based upon an experimental device constructed in which $r$ was .438 inch and L was .077 inch, curve 46 shows graphically the variation of the term L cos A with variations in the angle A, while the curve 47 shows variations in the term $r+L \sin A$ with similar variations in the angle A. It will be evident that as A increases above zero the term L cos A commences to decrease more and more rapidly while the term $r+L \sin A$, which has been increasing quite rapidly in the vicinity of zero, continues to increase although somewhat more slowly. Obviously the product of these two terms, and the force P which is proportional to this product, will reach a maximum where the rate of decrease of the term L cos A exactly equals the rate of increase of the term $r+L \sin A$, and the variations of the angle A in the vicinity of this point will have a minimum effect upon the size of the product and therefore upon the value of the force P. Curve 48 shows the resulting values of the force P.

The value A at which the force P will reach its maximum may be determined by differentiating Equation (9) with respect to A and equating $$\frac{dP}{dA}=0$$

which gives $$\frac{dP}{dA}=r \sin A+L (\sin^2 A-\cos^2 A)=0 \quad (10)$$

Substituting $(1-2 \sin^2 A)$ for $(\cos^2 A-\sin^2 A)$, gives:

$$2L \sin^2 A+r \sin A-L=0 \quad (11)$$

which, solved for sin A, gives:

$$\sin A=\frac{-r \pm \sqrt{r^2+8L^2}}{4L} \quad (12)$$

From the foregoing quadratic formula, the value of A for any values of $r$ and L may be readily computed. However, this formula will give the same value of A for any given ratio of $r$ to L, and this, taken with the consideration that only positive roots are of interest, permits further simplification of the formula to:

$$\sin A=\frac{\sqrt{Y^2+8}-Y}{4} \quad (13)$$

where Y is the ratio of $r$ to L.

In order to construct a governor in accordance with this invention, the values of $r$ and L or, at least the ratio of $r$ to L that will be maintained in the apparatus, must be chosen in advance. Thereupon the optimum value of angle A may be computed from either Equation (12) or Equation (13) above. Then the shape of lever 36 should be so designed that with lever 36 pressing against ball 31 so as to be just on the point of separating contact faces 4 and 5, the center of gravity of the lever will lie substantially on a line passing through the pivot center 39 and angling outward from the direction of motor shaft axis 41 by the computed angle A. By varying the relative amounts of stock on the portions of lever 36, lying respectively outside and inside of its pivot center 39, the angle A may be brought to any desired value and if brought to about the value computed as optimum, future variations of the angle A due to wear will have a minimum effect upon governed speed.

The advantage of this type of construction may in a large measure be realized without curving the lower end of lever 36. If the face of lever 36 is perfectly flat and "$d$" is used to designate the sum of the distance from that face to pivot point 39 plus the distance from that face to the center of ball 31, and "$A_0$" used to designate the value of angle A at which the surface of lever 36 is perpendicular to axis 41, then the pressure of the ball against stud 20 is equal to the pressure P as previously determined, times the correction factor.

$$\frac{\cos^2 (A_0-A)}{1-\frac{d}{r} \times \sin (A_0-A)}$$

If the specific device described hereinbefore in Figure 5 were equipped with a flat faced lever 36 with $d$ equal to .198 inch and $A_0$ equal to 9° 30′, this construction would give values of P as shown by curve 49 in Figure 5.

It will be evident by reference to curve 48 (Figure 5), that if the curved tip lever shown in Figure 4 is utilized, and lever 36 is so proportioned as to bring its center of gravity at an angle A which in the particular example covered by the curves of Figure 5 would lie in the neighborhood of 9° 30′, angle A may be varied 8° either way from its initial value before the resulting value of force P will vary by more than 1%. With a governor so constructed the speed at which the motor would operate for a given governor setting, would be very largely independent of any reasonable amount of wear. With the flat faced lever construction corresponding to curve 49 of Figure 5, it will be seen that only about 4½° departure each way from the optimum value of angle A would be possible before a 1% variation in force P would result, as against the 8° variation permissible with the curved tip lever construction covered by curve 48.

If in any given embodiment it can be definitely determined in advance whether the mechanical wear or the electrical wear will progress more rapidly during the use of the governor, lever 36 may be so constructed as to bring its center of gravity 40 to one side of the optimum value of angle A by several degrees in such a direction that the progress of wear will initially bring it closer to the optimum value of angle A. In this way it would be possible for a very large amount of total wear to take place before any appreciable effect upon the governed speed of the motor would be apparent.

The arrangement of contacts 4 and 5 in the motor circuit to effect the speed variations described may be made in any of numerous ways well known in the art; for example they may merely shunt out a resistance in the motor circuit so as to effect acceleration upon their closure. With such an arrangement, the torque exerted by the motor with contacts 4 and 5 closed is greatly in excess of that exerted when they are open, so that the governing mechanism will function to automatically proportion the relative periods of closure to secure an average torque output equal to the load.

The same effective torque may be produced without complete opening of the circuit through contacts 4 and 5 by drawing an arc between the contacts as they are opened by the governor, until the resistance of the arc in parallel with the motor circuit resistance above referred to is just sufficient to reduce the torque produced to equality with the load.

When operating on direct current such a governor as disclosed tends to reach a balanced condition in which a constant short arc is maintained between contacts 4 and 5. This tends to cause too rapid deterioration of metal contacts, and the invention therefore contemplates the provision of adjustable means for frictionally resisting movement of either lever 36 or lever 6 so as to produce a positive make and break action of contacts 4 and 5.

As shown in Figure 2, the rod 7 upon which lever 6 is pivoted is threaded at one end and carries lock nuts 9 adapted for adjustment to press the arms of bracket 8 against the pivot wings of lever 6, the friction thereby set up resisting movement of lever 6 sufficiently to insure the action above described. For operation on alternating current, the nuts 9 may, of course, be completely loosened since no such hazard is to be met.

Exceptionally smooth governing operation may be obtained by employing a non-arcing variable resistance in the place of the contacts 4 and 5 of Figure 1. As shown in Figure 1A a small rheostat 51 of the carbon compression type, comprising carbon discs or granules 52 contained in an insulating tube 53 and subjected to compression between a stud 54 carried on bracket 3 and a stud 55 on lever 6, will subserve the function of the arc above described without producing objectionable deterioration of the elements involved. Such a rheostat preferably operating in parallel with a fixed resistance will maintain the governed device very smoothly at a constant speed.

In Figures 6, 7, and 8 an alternative embodiment of the invention is disclosed in which the self-centering and low inertia advantages of the ball contact feature of the invention are retained in a governor structure employing contacts resiliently supported by spring leaves which may be differentially flexed to adjust the governed speed of the device subject to its control.

Motor frame 60 is provided at one end with supporting legs 61 to which is secured a plate 62 on which the non-rotating elements of the governor are supported. These comprise contacts 63 and 64 carried on the ends of spring leaves 66 and 67, respectively, supported on insulated sleeves or bushings 76 as hereinafter described, and secured intermediate their ends to coacting spring leaves 71 and 72 respectively, which are also carried by bushings 76 so that parallelogram structures are formed which constrain each contact to move along a substantially straight line. A shield 73 of insulating paper or similar material, also carried by bushings 76, extends between spring leaves 66 and 67 for a sufficient distance to reduce the liability of accidental contact between them to a minimum.

Supporting bolts 68 are threaded into the insulating bushings 76 for a sufficient distance to secure said bushings to the supporting plate 62, and the spring leaves are separated from each other by insulating washers 77. Adjacent and in contact with the spring leaf 66 is a metal washer 78 provided with a laterally extending lug 79 to which electrical connection may be made while adjacent and in contact with the spring leaf 67 is a metal washer 81 having a laterally extending lug 82 with which electrical connection may be made.

The aforementioned spring leaves are biased to maintain the contacts 63 and 64 together subject to separation by the hereinafter described mechanism responsive to changes in centrifugal force effected as the speed of the governed device increases. Supported adjacent one end of the motor shaft 86 is a plate 87 on which is pivoted at 88 a lever 89 urged clockwise about its pivot by a spring 91 compressed between a lug on an overturned ear of plate 87 and an opposite lug on lever 89, (see Figure 7).

Slidably retained in a counterbore of shaft 86 is a member 96 having an enlarged and counterbored outer end 97 in which a ball 98 is guided. The enlarged outer end 97 of member 96 is also recessed at right angles to its axis to permit insertion of the ball 98 and after insertion of said ball to receive the free end of lever 89 which prevents egress of the ball 98 in the direction of its entry, egress in the opposite direction being prevented by staking over the end of head 97, as shown.

As the motor shaft 86 accelerates, centrifugal force acting upon lever 89 will rock it in a counter-clockwise direction, compressing spring 91 and sliding member 96 to the right (as shown in Figure 6) within the counterbore of the shaft 86. As this movement proceeds, ball 98 will be brought into contact with plate 99 of insulating material, flexing spring leaves 67 and 72 and carrying contact 64 away from contact 63, movement of the latter being prevented by the enlarged head 101 of rod 102, also of insulating material.

Separation of contacts 63 and 64 causes deceleration of motor shaft 86 reducing the centrifugal force effective upon lever 89 and permitting spring 91 to expand and rock said lever in a clockwise direction. Spring leaves 67 and 72 may then press the plate 99 against the ball 98 causing the latter to recede within the counterbored head 97 of member 96, but since the ball surface projects slightly beyond the end of head 97, this action will not cause any movement of the member 96 within the counterbore of shaft 86, because only a very slight movement will be necessary to bring contacts 63 and 64 back into contact with each other, preventing further deceleration of the motor shaft 86.

It will be apparent from the foregoing description that while the motor is running at operating speed, it is necessary for the spring leaves 67 and 72 and the mechanism responsive to centrifugal force opposed thereto to move only the ball 98, which rolls freely within the counterbored end of member 96, rather than to overcome the comparatively larger frictional resistance incident to moving the member 96 within the counterbore in shaft 86. By this arrangement, excessive variations from the desired operating speed during the process of operation of the governor are avoided.

Selection of the speed to which the governor will hold the motor may be effected by axial adjustment of rod 102 within sleeve 103 fixed in plate 62. The external surface of this sleeve is threaded as at 104 to receive a knurled nut 106 within which a screw plug 107 is adjustably received and retained by means of a set screw 108. Pin 109 fixed in plate 62 lies in the path of rotation of a pin 111 carried by nut 106 so as to limit the movement of said nut to a single rotation. With this arrangement the broad range of speeds within which it may be desired to control the motor may be selected by adjustment of plug 107 within nut 106 while the exact speed to which the governor will hold the motor may be selected by manual adjustment of nut 106. Movement of rod 102 to the left, as shown in Figure 6, will flex spring leaves 66 and 71 carrying contact 63 to the left. During such adjustment contacts 63 and 64 will, of course, be maintained in contact by spring leaves 67 and 72, but it is apparent that less counter-clockwise movement of lever 89 and hence less compression of spring 91, will be required to separate contacts 63 and 64 after such leftward movement, and that thereafter they will be separated at a lower speed of the shaft 86. The purpose, therefore, in this modification of the structure of the ball-carrying member 96, is to allow for the different lateral positioning of plate 99 which may thus be effected by this form of speed adjusting mechanism, movement of the ball alone caring for the actual making and breaking, as in the first disclosed form.

While specific embodiments of the invention have been described herein, it will be apparent that numerous variations will occur to persons skilled in the art and it is therefore understood that the scope of the present invention is limited only by the spirit of the appended claims.

I claim:

1. In a governor comprising a rotatable member; means for controlling the speed of rotation thereof comprising electrical circuit controlling means, means responsive to variations in the speed of said member for operating said circuit controlling means, and adjustable means for frictionally resisting operation of said circuit controlling means.

2. In a governor, a rotating element having an axial recess, a control member guided in said recess, a second control member carried by said first control member, mechanism carried by said element and responsive to centrifugal forces to selectively move said control members as a unit or to move said second control member independently.

3. A governing device comprising a rotatable member, a freely suspended oscillatory lever carried thereby and means responsive to an increase of centrifugal force in said lever for arresting acceleration of said rotatable member, the mass of said lever being distributed so as to offset the effect of variations in the angular operating position of said lever on the speed of said rotatable member.

4. A governing device comprising a controlling element, a member rotatable with respect thereto, and a pivoted lever carried by said member and responsive to changes in centrifugal force to exert a variable force against said element, the center of gravity of said lever being located substantially as indicated by the formula:

$$\sin A = \frac{\sqrt{Y^2+8}-Y}{4}$$

where A is the acute angle that a line extending from the pivotal axis of said lever through the center of gravity thereof makes with a line parallel to the axis of rotation of said rotatable member; and Y is the ratio that the distance from said pivotal axis to said axis of rotation bears to the distance from said pivotal axis to said center of gravity.

HAROLD T. AVERY.